(12) United States Patent
De Pellegrin et al.

(10) Patent No.: US 10,465,331 B2
(45) Date of Patent: Nov. 5, 2019

(54) LAUNDRY TREATMENT APPLIANCE

(71) Applicant: Electrolux Appliances Aktiebolag, Stockholm (SE)

(72) Inventors: Andrea De Pellegrin, San Foca di San Quirino (IT); Alberto Bas, Sesto al Reqhena (IT)

(73) Assignee: Electrolux Appliances Aktiebolag (CH)

( * ) Notice: Subject to any disclaimer, the term of this patent is extended or adjusted under 35 U.S.C. 154(b) by 315 days.

(21) Appl. No.: 15/352,645

(22) Filed: Nov. 16, 2016

(65) Prior Publication Data

US 2017/0137991 A1    May 18, 2017

(30) Foreign Application Priority Data

Nov. 16, 2015 (EP) .................................. 15194803

(51) Int. Cl.
 *D06F 58/28* (2006.01)
 *G06F 3/0362* (2013.01)
 *D06F 39/00* (2006.01)

(52) U.S. Cl.
 CPC ........... *D06F 58/28* (2013.01); *D06F 39/005* (2013.01); *G06F 3/0362* (2013.01); *D06F 2058/2803* (2013.01); *D06F 2058/2883* (2013.01); *D06F 2216/00* (2013.01)

(58) Field of Classification Search
 USPC ....................................................... 340/3.71
 See application file for complete search history.

(56) References Cited

U.S. PATENT DOCUMENTS

| | | | | |
|---|---|---|---|---|
| 5,782,012 A | * | 7/1998 | Sanders | D06F 58/28 |
| | | | | 34/527 |
| 2003/0024281 A1 | * | 2/2003 | Peterson | D06F 33/02 |
| | | | | 68/12.27 |
| 2003/0024796 A1 | * | 2/2003 | Peterson | D06F 33/02 |
| | | | | 200/11 R |
| 2006/0164397 A1 | * | 7/2006 | Bruntz | D06F 39/005 |
| | | | | 345/172 |
| 2009/0201124 A1 | | 8/2009 | Kim et al. | |
| 2010/0000024 A1 | | 1/2010 | Hendrickson et al. | |

(Continued)

FOREIGN PATENT DOCUMENTS

| CN | 204434991 U | 7/2015 |
|---|---|---|
| DE | 4031266 A1 | 4/1992 |

(Continued)

OTHER PUBLICATIONS

Extended European Search Reported dated Feb. 24, 2016 in corresponding European Application No. 15194803.1.

(Continued)

*Primary Examiner* — Joseph H Feild
(74) *Attorney, Agent, or Firm* — RatnerPrestia

(57) ABSTRACT

A laundry treatment appliance (2) has a user interface (62). The user interface (62) has an assembly (66) having at least one fixed element (68, 72, 80), at least one rotary element (76, 88), and a display (68). The at least one the rotary element (76, 88) is a built as user interface element (44), the display (68) is arranged inside the user interface element (44), and at least one rotary element (76, 88) is axially constrained by at least one fixed element (68, 72, 80).

13 Claims, 5 Drawing Sheets

(56) References Cited

U.S. PATENT DOCUMENTS

| | | | |
|---|---|---|---|
| 2010/0043499 A1* | 2/2010 | Choi | D06F 39/005 68/13 R |
| 2013/0180840 A1* | 7/2013 | Boesner | D06F 33/02 200/564 |
| 2014/0049926 A1* | 2/2014 | Bas | D06F 39/005 361/759 |
| 2014/0131180 A1 | 5/2014 | Williamson et al. | |
| 2014/0137608 A1 | 5/2014 | Seikel et al. | |
| 2015/0299929 A1* | 10/2015 | Yang | D06F 39/005 362/23.1 |
| 2015/0299930 A1* | 10/2015 | Yang | F21V 23/005 362/23.11 |
| 2015/0315737 A1* | 11/2015 | Yang | F21V 33/0044 362/23.04 |
| 2017/0137991 A1* | 5/2017 | De Pellegrin | D06F 58/28 |
| 2017/0235383 A1 | 8/2017 | Goss et al. | |
| 2019/0003102 A1* | 1/2019 | LV | D06F 23/04 |

FOREIGN PATENT DOCUMENTS

| | | | |
|---|---|---|---|
| DE | 19908363 | A1 | 8/2000 |
| DE | 10261284 | A1 | 7/2004 |
| EP | 1555684 | A1 | 7/2005 |
| EP | 1884857 | A1 | 2/2008 |
| EP | 2589696 | A1 | 5/2013 |
| EP | 2620535 | A1 | 7/2013 |
| EP | 2650422 | A1 | 10/2013 |
| EP | 2933368 | A1 | 10/2015 |
| EP | 2937455 | A1 | 10/2015 |
| WO | 2015082127 | A1 | 6/2015 |

OTHER PUBLICATIONS

Extended European Search Report dated Apr. 20, 2016 in related European Application No. 15194771.0.

Extended European Search Report dated Apr. 5, 2016 in related European Application No. 15194759.5.

European Communication Pursuant to Article 94(3) for European Application No. 15 194 759.5, dated Oct. 19, 2018, 5 pages.

European Communication Pursuant to Article 94(3) for European Application No. 15 194 759.5, dated Feb. 6, 2018, 5 pages.

Final Office Action for U.S. Appl. No. 15/352,636, dated May 9, 2019, 25 pages.

Notice of Allowance for U.S. Appl. No. 15/352,621, dated Mar. 8, 2019, 6 pages.

Notice of Allowance for Application No. U.S. Appl. No. 15/352,636, dated Aug. 6, 2019, 6 pages.

* cited by examiner

LAUNDRY TREATMENT APPLIANCE

CROSS REFERENCE TO RELATED APPLICATION

This application claims priority to European Application No. 15194803.1 filed Nov. 16, 2015, the content of which is hereby incorporated by reference in its entirety.

FIELD

The present invention generally relates to a laundry treatment appliance, especially a washing machine, dryer or combined washer and dryer, both for domestic and professional use. More particularly, the present invention relates to a laundry treatment appliance comprising a user interface and an assembly comprising an electronic board.

BACKGROUND

Laundry machines such as washing machines, dryers, especially tumble dryers, and combined washers/drawers are known which comprise a user interface which can be, for instance, be arranged on a front panel. The user interface typically provides several user interface elements for selecting or inputting a desired laundry treatment program and/or related parameters for this program. The user interface can also provide symbols, lights, displays or other indicators which allow giving the user a feedback on the selected choices. While switches and push knobs are often used, as a selecting device for a treatment program among a set of available programs, a rotary user interface element such as a rotating or rotary knob, which can also have the functionality of a push button, is often provided. By turning the knob, the user can easily select a desired treatment routine.

The rotary user interface element is a most important element for operating the machine and is used very often. It therefore is of great importance to ensure a long lifetime and also an accurate operation of this user element. Common solutions can lead to misalignment between rotary components and their surrounding parts, which can cause an incorrect or inaccurate rotation of the knob and to damage of the components.

The rotary user element as the primary interface of the machine transmits the first impression to the user of the quality and handling of the appliance. If the user encounters a user interface element that is easy and convenient to handle and provides a constant, steady and solid feedback, and if she or he fells a smooth passage between the several rotational steps during the rotation of the user interface element, she or he gains a good quality impression of the appliance. If otherwise the user interface element has a shaky, unpredictable, or varying response, resulting for example in a rough and variable force needed for the rotation of the user interface element, the user projects this impression on the appliance and gets an impression of overall low quality. Therefore, the user interface should be operated with a constant force feedback and should be reliable and should not block.

SUMMARY OF SELECTED INVENTIVE ASPECTS

An aim of aspects of the invention is to provide a laundry treatment appliance which provides a reliable and robust operation of a rotary user interface element.

It is a further aim of aspects of the invention to provide a household appliance to provide a laundry treatment appliance with a user interface that is cheap and easy to manufacture.

Aspects of the invention therefor relate to a laundry treatment appliance, comprising a user interface, the user interface comprising an assembly, the assembly comprising at least one fixed element, at least one rotary element, and a display, whereby at least one rotary element is a built as user interface element, whereby the display is arranged inside the user interface element, wherein the at least one rotary element is axially constrained by at least one fixed element.

Aspects of the invention are based on the consideration that the user interface element is a key component for a laundry treatment appliance, since it provides the possibility for the user to set the desired laundry treatment program and parameters thereof. The user interaction should be both reliable and accurate. If the user interface element is malfunctioning or out of order, the machine needs immediate maintenance and/or the quality feeling of the machine is affected. If the user interaction is not functioning accurately, a wrong program or parameter thereof could be chosen without the user recognizing this choice, leading to potentially damaged laundry or malfunctioning of the machine. By construction, the knob module should allow precise handling and a long lifetime. Especially blockage of components of the knob module, which can occur in known assemblies, should be avoided.

Applicant has found that a reliable knob module can be realized by in a first step functionally identifying fixed and rotating components and in a second step by employing at least one fixed component to axially constrain the rotating components. In this way, the fixed components, which by definition are not constructed to move, build a movement barrier for the rotating ones. No additional parts or components which could lead to additional malfunctioning are needed in order to provide a highly functional user interface element. The at least one constraining fixed element avoids the risk of blockage and simultaneously provides a convenient feeling of quality.

The terms laundry treatment appliance or laundry machine or laundry treatment device includes washing machines as such but also combined washing/drying machines that can incorporate both functionalities. Also the terms laundry washing machine and washing machine are used interchangeably. The laundry washing machine can, for instance, be designed as a front-loading laundry washing machine. Alternatively, the appliance can be a dryer.

The at least one said rotary element is axially constrained by at least one fixed element in the mounted or assembled position of the laundry treatment position which corresponds to the position in which its regular functionality is used.

Preferably, the display is arranged rotationally fixed with respect to at least one fixed element. The display preferably shows appliance parameters and/or allows interaction with the appliance through adjustment and/or setting of parameters. The display thus does not turn or move when the user operates the user interface element. Especially in the case of a knob, the co-rotating of the display would it make difficult and inconvenient for the user to read the information provided on the display.

In a preferred embodiment, the fixed element comprises a constraining portion shaped at least partially as a plane against which the rotary element at least partially axially abuts. The plane essentially builds a spatial blockage for the respective rotary element. By using a plane, the axial motion is also reliably hindered without blocking or jamming of additional components.

The assembly preferably comprises an electronic board or circuit board. This board preferably comprises electronic means for receiving user input, displaying status information to the user and for operating the machine based on the entered user input.

The rotary elements advantageously comprise a rotary knob and a rotary encoder. The rotary encoder allows transmitting to the electronic board the rotational position of the rotary knob. To this end, the rotary encoder is preferably coaxially arranged and co-rotating with the rotary knob, which makes the identification of the rotational position or state of the rotary knob especially easy.

The rotary encoder preferably comprises a step-like shape which in the mounted position faces the electronic board and interacts with at least one optical transducer. In this way, the rotational position or state of the encoder with respect to the circuit board can be transmitted. Preferably, two or more optical transducers are provided, placed in different position with respect to the step-like shape, to recognize the rotational direction of the rotary encoder.

The step-like shape of the rotary encoder preferably is provided on one of its axial extremities which faces the electronic board.

In a preferred embodiment, the at least one optical transducer is built as optocouples. Alternatively the at least one optical transducer can be built as a magnetic or inductive transducer.

The optical transducer is preferably arranged on the electronic board. This results in an especially compact design, since no additional positioning elements are necessary for providing the optical transducer opposite to and facing the encoder.

The fixed elements preferably comprise a box and/or a display support and/or a display window. The box is preferably used to house the electronic circuit board and to at least partially encompass the user interface element. The display support is preferably built in a canal-shaped design with a shell and the display being the face plate.

The display window is preferably designed to be imposed on the display support and preferably has a window through which the display is visible. In this way, the display is protected against dirt, water or mechanical impact.

In a preferred embodiment, the rotary encoder is axially constrained between the box and the display window in their respective mounted positions.

Preferably, box and display window each comprise a constraining portion at least partially shaped as a plane against which the rotary element at least partially abuts.

The display window is preferably engaged with the box by at least one connection element, preferably yielding preferably a firm connection but allowing detaching both components from each other.

The display support is preferably engaged with the electronic board by at least one connection element, preferably yielding preferably a firm connection but allowing detaching both components from each other.

The connection element used for the respective connection between display window and box and/or display support and electronic board is preferably a snap tooth. Alternatively or additionally, bayonet connection(s)/screw means/rivets can be used. Preferably, these respective connections are realized in a non-permanent way, which facilitates the exchange of damaged or malfunctioning components.

The display is advantageously built as an LCD, LED, or TFT display.

In a preferred embodiment, at least one illuminating light element is arranged peripherally with respect to the user interface element. This light element is preferably illuminated as a function of the rotational state of the rotary knob. A light group with a plurality of light elements can be provided, whereby, for instance, the illumination of each light element corresponds to a different rotational state/direction of the rotary knob.

Preferably, at least one light guide is provided in front of at least one light element, whereby said light guide is constrained on a light guide seat provided on the box.

In this way, an illuminating element can be provided on the board, of which emitted light via the light guide can be transmitted to the light element in such a way that the light element is illuminated, which then is preferably directly visible to the user. Moreover, the assembly of the light element is obtained without additional components, using those composing the user interface element.

The user interface element is advantageously configured as a stand-alone component, which facilitates maintenance and replacement.

The user interface element preferably comprises at least one additional user element.

Preferably, the additional user element is a switch. The switch is preferably used to activate/start and/or pause and/or stop a selected routine or program. It can also be used to switch on or off the appliance.

Advantages of aspects of the invention are essentially as follows. By axially constraining the respective rotary element by a fixed element, no additional components or mechanisms are needed, yielding a reliable and robust design. By geometrically using a plane of a fixed element against which a rotary element abuts, jamming between adjacent components is prevented.

BRIEF DESCRIPTION OF THE DRAWINGS

Further features and advantages of the present invention shall become clearer from the following detailed description of some of its preferred embodiments, made with reference to the attached schematic drawings and given as an indication and not for limiting purposes.

In particular, the attached drawings are included to provide a further understanding of the invention and are incorporated in and constitute a part of this specification. The drawings together with the description explain the principles of the invention. In the drawings, corresponding characteristics and/or components are identified by the same reference numbers. In these drawings.

DETAILED DESCRIPTION OF EXAMPLE EMBODIMENTS

Figure 1:
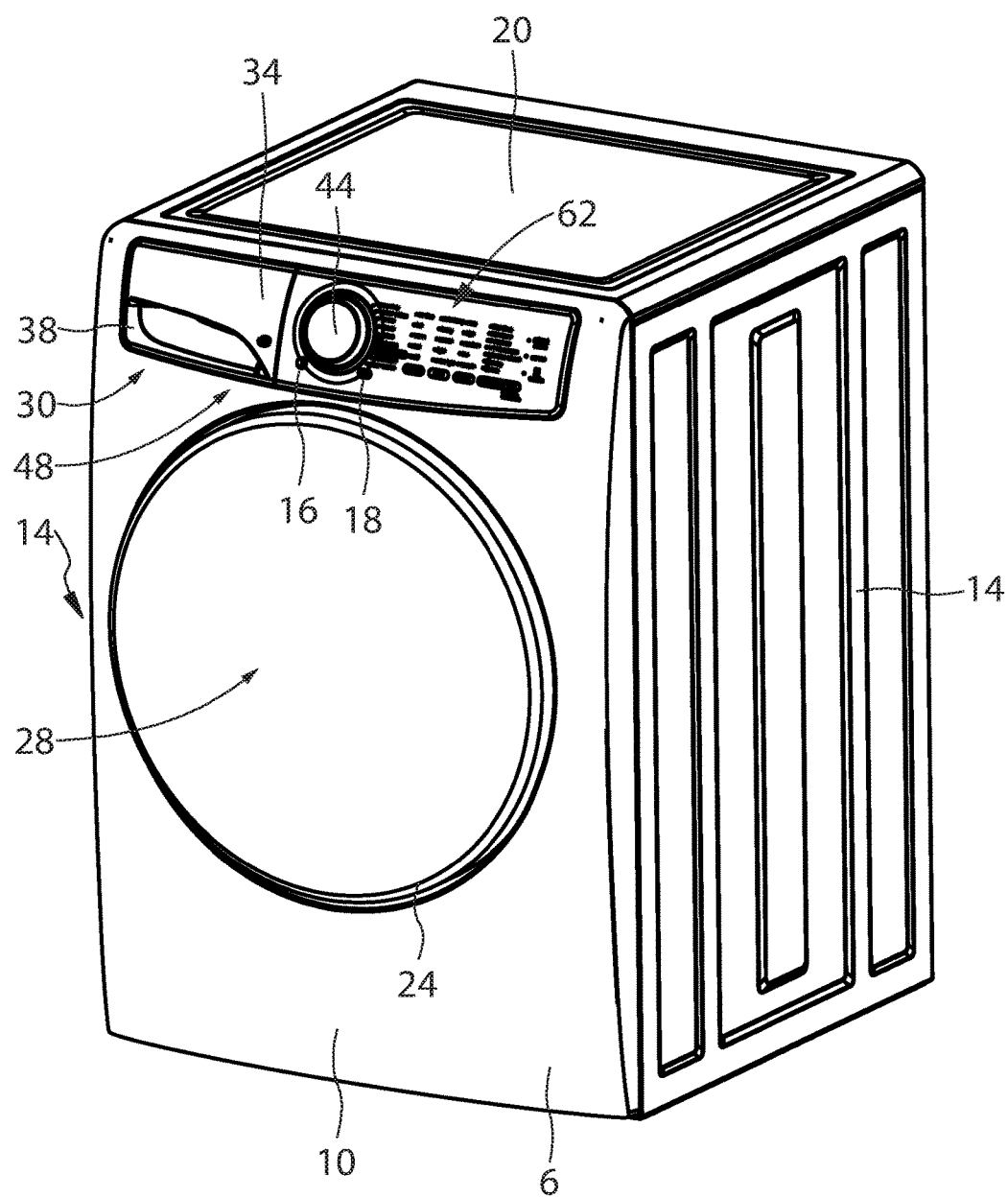
FIG. 1 shows a laundry treatment appliance in a preferred embodiment with a front panel comprising a drawer and a rotary knob.

In FIG. 1, a laundry treatment appliance 2 is shown which is built as a front-loading washing machine and comprises a housing or casing 6 with a preferable parallelepiped shape, the casing 6 comprising a front wall 10, two side walls 14, a cover plate 20 and a rear wall (not shown). Front wall 10 and side walls 14 are preferably part of a cabinet. A front door 24 is provided which can be opened for loading or unloading laundry through an opening 28 into a washing drum.

Advantageously a washing tub is contained within casing 6, whereby a rotatable and perforated drum is contained by said washing tub. Both washing tub and drum have a substantially cylindrical shape. Advantageously the tub is suspended in a floating manner inside casing 6 by means of a number of coil springs and shock absorbers. The drum is rotated by an electric motor (not shown), which transmits the rotating motion of a motor shaft to the drum by a belt/pulley system. In a different embodiment of the invention, the motor can be directly associated with the shaft of the drum. The tub is preferable connected to casing 6 by means of an elastic bellows or gasket. Alternatively, the laundry appliance can be a dryer (in which case the tub is not provided) or a combined washer and dryer.

The preferred washing machine shown in FIG. 1 on a front panel 48 comprises a drawer 30 with a front plate 34 and a handle 38 for pulling out and pushing back in drawer 30. Drawer 30 comprises at least one compartment for detergent or washing additives. Adjacent to drawer 30, a rotatable or rotary knob 44 is arranged for selecting a laundry treatment program and/or at least one parameter of a laundry treatment program. Preferably, knob 44 has also a push-functionality and can be pressed for selected and/or confirmation of selected options. Knob 44 is provided on a user interface 62 which can provide further indicating and/or control elements. Knob 44 is preferably arranged on front panel 48 adjacent to drawer 30, whereby no user interface elements such as controls (buttons, dials) or indicating elements (displays, lights) are arranged between drawer 30 and knob 44. On user interface 62, adjacent to user interface element 44, a first touch switch 16 and a second touch switch 18 are preferably provided. Touch switch 16 is preferably provided on the lower left side of user interface element 44 and is used to switch on or off said appliance 2. Touch switch 18 is preferably used to select a treatment program or options related to the currently selected program.

Figure 2:
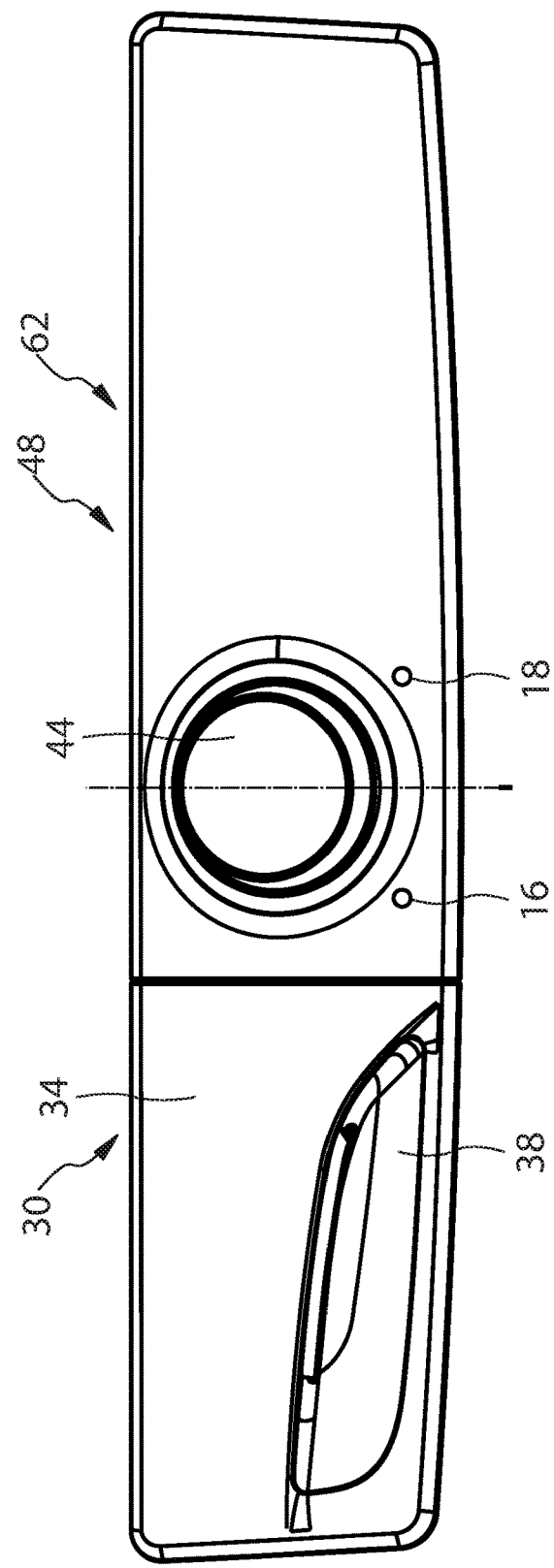
FIG. 2 shows the front panel of laundry washing machine according to FIG. 1.

The front panel 48 of laundry treatment appliance 2 is shown in an enlarged view in FIG. 2. The user interface 62 preferably comprises further user interface elements such as touch buttons 16, 18 (see below) for operating the laundry treatment appliance 2 and/or for providing information on the current state, especially the selected program and/or parameters thereof. These user interface elements can comprise buttons, displays, light elements etc.

Figure 3:
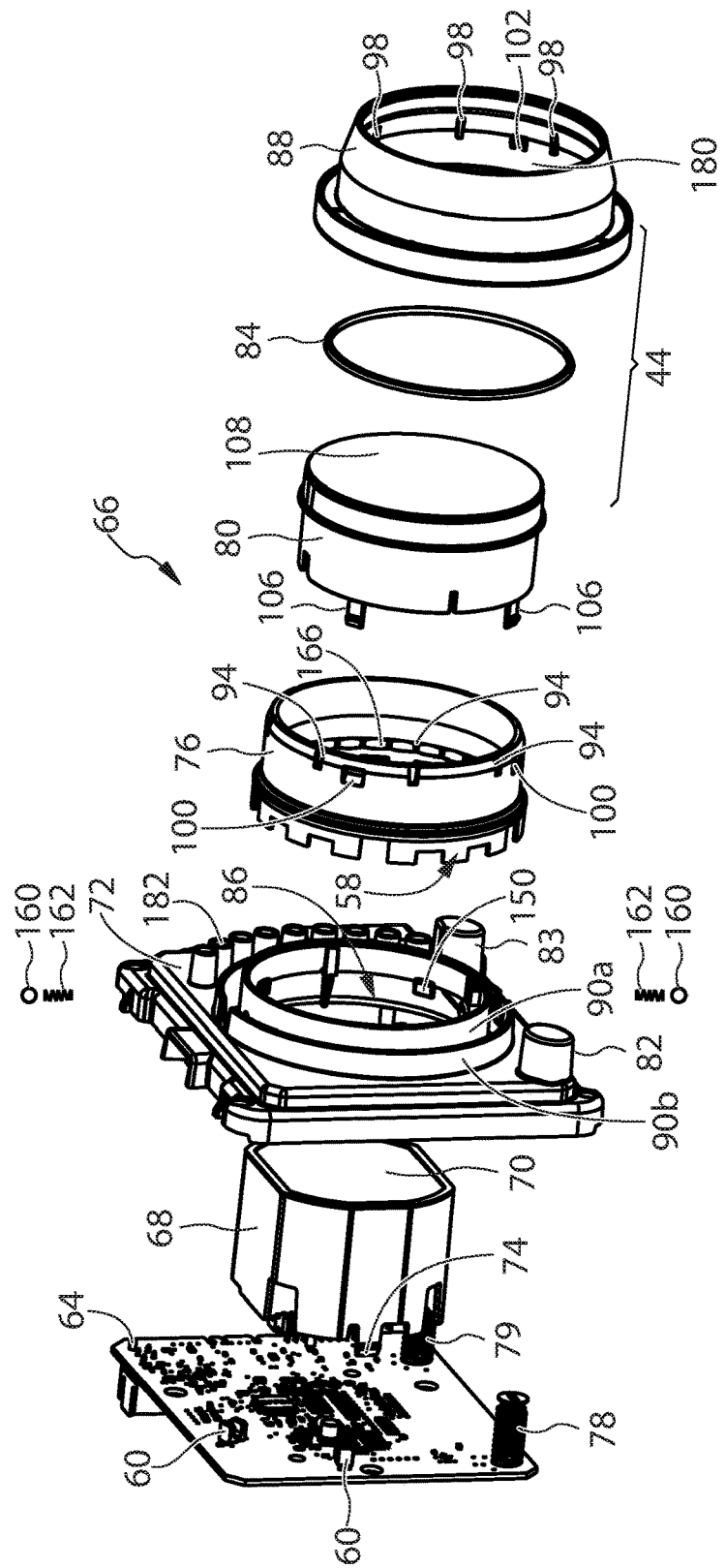
FIG. 3 shows a knob module in an explosive view.

In FIG. 3, in an explosive view, a knob module 66 is shown which encompasses parts of knob 44 shown in FIGS. 1 and 2. Knob module 66 preferably comprises a circuit board 64 or printed circuit board (PCB) on which a display support 68 is preferably mounted. Display support 68 comprises as a face plate which is preferably aligned in parallel to circuit board 64 a display 70 which in the current embodiment is preferably built as an LCD. Display 70 displays information to the user regarding the selected laundry treatment program and/or parameters. Display support 68 preferably comprises snap teeth 74 for connecting it to circuit board 64. Preferably, at least two snap teeth 74 are provided on display support 68. A box 72 is preferably provided which in an assembled or mounted state preferably receives circuit board 64. Board 64 is preferably fixed to box 72, preferably by a snap-like connection for easy replacement of board 64.

Springs 78, 79 which are preferably mounted on board 64 are preferably received by seats 82, 83 of box 72. At the respective distant end of seats 82, 83, touch areas 85, 87 are arranged. Seats 82, 83 serve to guide springs 78, 79 that they are positioned behind touch areas 16, 18 on the user interface 62. Moreover, at least an optical transducer 60 is preferably provided on the board 64; said transducer can preferable be a optocoupler, configured to recognize the passage of the encoder 76 as below described. Alternatively, two or more transducer can be provided. Box 72 preferably comprises a circular opening 86 which is surrounded by two concentric sheaths 90a, 90b, whereby sheath 90a is an inner sheath with a smaller diameter than outer sheath 90b.

Knob module 66, which is an assembly of various components, further comprises a rotary encoder 76 which in a mounted position with a preferable step-like shape 58 interacts with optocouples 60 provided on circuit board 64. Shape 58 is partially arranged between sheaths 90a, 90b in a mounted state. Encoder 76 in a mounted position is received by a knob shell 88. Encoder 76 co-rotates with knob shell 88 and thereby can be used to detect the rotational position or state of knob shell 88. Said detection can be preferable reached through the change of signal from the optocoupler during the passage of the step-like profile 58 through said optocoupler; in case of two or more optocouplers, the sequence of signals deriving from each optocoupler allows the recognition of the direction of the encoder rotation (clockwise or anticlockwise direction). Encoder 76 preferably comprises recesses 94 which in a mounted state receive protrusions 98 of knob shell 88 and thus provide a rotational locking (engagement) between encoder 76 and knob shell 88. Encoder 76 furthermore preferably comprises seats 100 for engaging with connection elements or snap teeth 102 of knob shell 88. In this way, axial extraction of knob shell 88 from encoder 76 is avoided.

A preferably overinjected display window 80 in a mounted state is imposed on display support 68. Display window 80 is assembled on box 72 and preferably comprises snap teeth 106 for engaging in seats 150 of box 72 and thereby realizing a connection with box 72. Display window 80 comprises a cover plate 108 which is at least partially transparent as to allow the user to see information displayed on display 70. Preferably a gasket 84 in a mounted position is sealing the circular space between display window 80 and knob shell 88. Knob shell 88 provides an opening 180 which is dimensioned to allow the passage of display window 80. Display window 80, gasket 84 and knob shell 88 are preferably parts of knob 44. Display window 80 in an assembled state is imposed on display support 68. Cover plate 108 in an assembled state is preferably the front surface of knob 44. On user interface 63, light elements are arranged; according to a preferred embodiment, said light elements are provided on the board 64. Seats 182 of light guides are provided on box 72 and axially lead the respective light guide from circuit board 64 to user interface 62.

Figure 4:
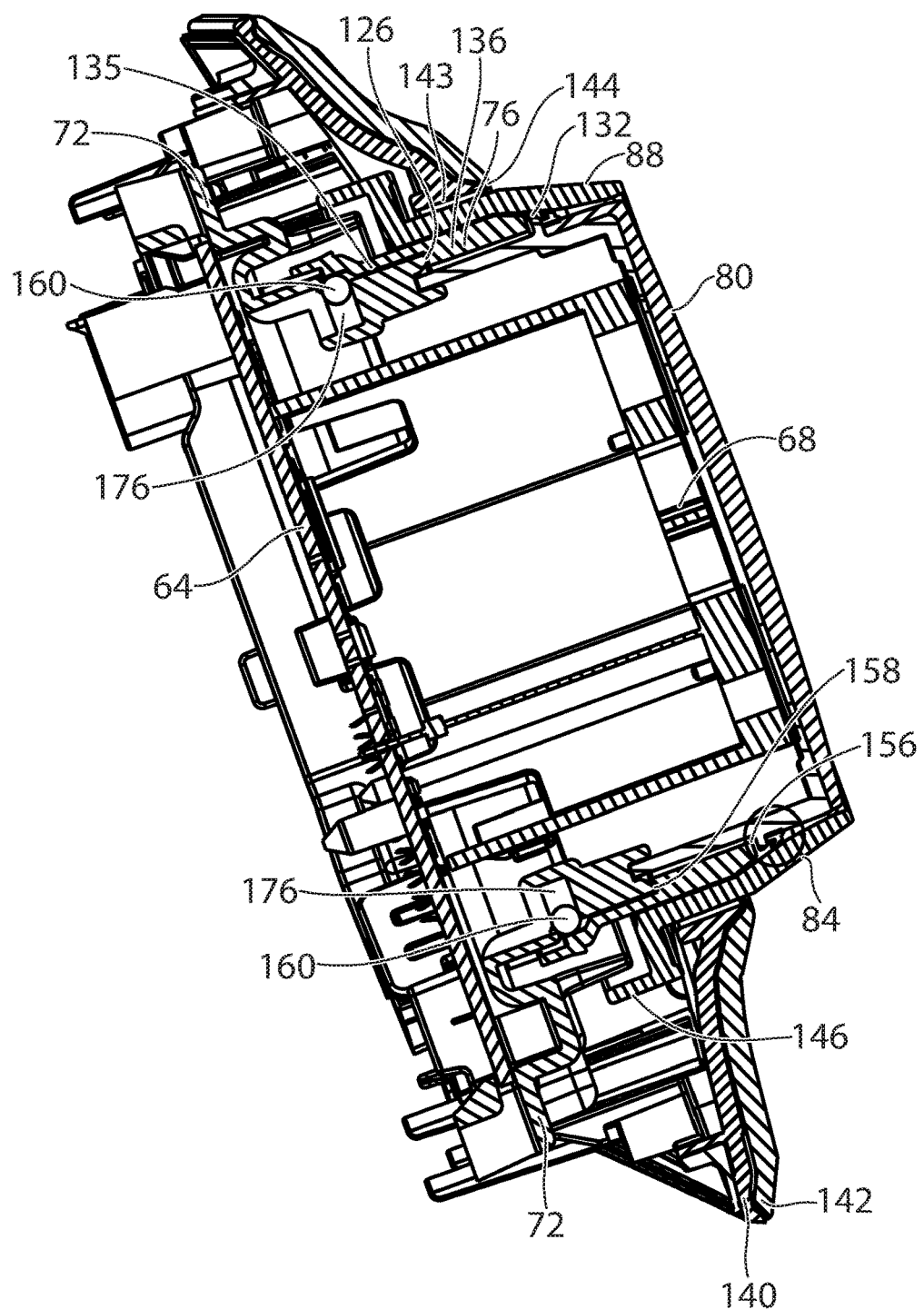
FIG. 4 shows a section through the knob module of FIG. 2 along the cross-section line A-A.

As can be seen in FIG. 4, the user interface 62 preferably comprises two layers, namely a first carry layer 140 and a second cover layer 142. Cover layer 142 is preferably connected to carry layer 140 by means of an adhesive and/or by a snap connection. Both layers preferably comprise a respective hole 143, 144 configured such that in the mounting position, the knob, in particular the knob shell 88 and the rotary encoder 76 and preferably the display windows pass through.

In knob module 66, display support 68, box 72 and display window 80 are preferably fixed components. Encoder 76 and knob shell 88 are rotating components. In the mounted state of knob module 66, the rotating components should be allowed to rotate easily. Their axial motion, however, both with respect to each other and with respect to the fixed components, should be constrained and hindered.

According to aspects of the invention, at least one of the rotating components is axially constrained by fixed components without need for additional parts, as will be discussed in relation with FIGS. 3 and 4. The rotary encoder 76 is preferably axially constrained by a first plane 126 of box 72 and a second plane 132 of display window 80. Encoder 76 preferably comprises an upper shoulder 156 and a lower shoulder 158 of its internal diameter, whereby encoder 76 at is upper shoulder 156 is axially constrained by plane 132 and at is lower shoulder 158 is axially constrained by plane 126.

A hull-like part 136 of encoder 76 is thereby preferably hindered to move towards circuit board 64 or away from circuit board 64 in an axial direction. Part 136 of encoder 76 abuts against planes 126, 132 and is thereby hindered to move axially, i.e. perpendicular to cover plate 108. Moreover, the encoder 76 is radially constrained by the fixed elements; according to the shown preferably embodiment, the intermediate internal diameter 135 is inserted on the inner sheath 90a of the box 72 on its mounting position, assuring an radial constraining between said two components and consequently between the rotary elements and the fixed elements.

Preferably, in the assembled state of knob module 66, on two opposing sides of box 72, respectively a sphere 160 is pushed by a spring 162 into a corrugated portion 166 of encoder 76. Springs 162 are located in pockets 176 formed in an inner sheath-like part 170 of box 72. Corrugated portion 166 comprises a plurality of indentations which are arranged with constant circumferential distance. In this way, while knob shell 88 is turned, a steady feeling for the user is obtained in the intervals between adjacent indentations. When the sphere 160 or ball is entering an indentation, the user experiences a "click", indicating to him a defined and discrete position and selection. In this way, by the user element yielding precise feedback on this operation of the knob, the user obtains a high-quality impression of the whole appliance. Alternative positions of the ball with spring and the indentation can be provided in a equivalent way, so that one of the ball or indentation can be provided on a fixed element whereas the other can be provided on the rotary element, in such a way to interact each other as above explained.

Knob shell 88 preferably comprises a lateral collar 146 which in its cross section is T-shaped and internally overlaps with layers 140, 142, thereby avoiding entrance of water into knob module 66. In the present embodiment of knob module 66, all electronic components on circuit board 64 are radially arranged within the extension of the knob shell 88 and are thereby protected against water or contaminating particles.

Figure 5:
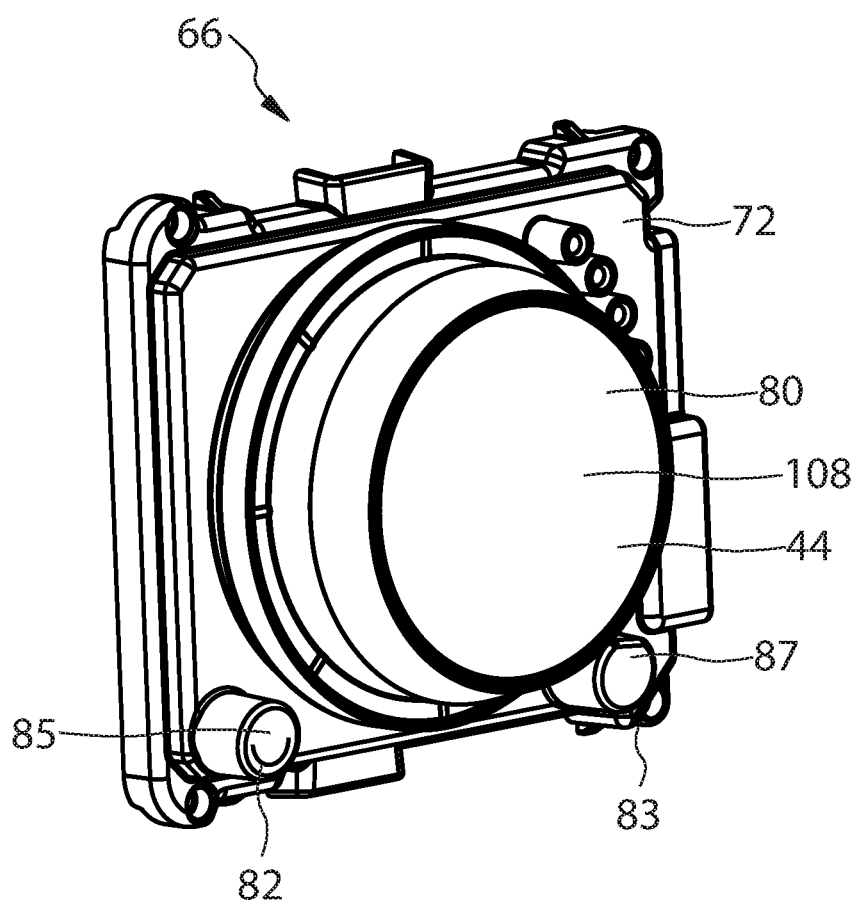
FIG. 5 shows an isometric view of the knob module of FIG. 3.

FIG. 5 shows knob module 66 in an assembled state in which it can be operational and mounted on front panel 48 of laundry treatment appliance 2.

Aspects of the invention thus conceived can be subjected to numerous modifications and variants all falling within the scope of the inventive concept. For example, the above described preferred embodiments concerning the connection means between circuit board 64 and display support 68 and/or between box 72 and display window 80 can be combined or at least partially reversed by a skilled person depending of the dimension/mechanic/shape constrains of each single appliance.

In addition, all details can be replaced by other technically equivalent elements.

In practice, all the materials used, as well as the shapes and contingent dimensions, may vary depending on the requirements without departing from the scope of protection of the following claims.

What is claimed is:

1. A laundry treatment appliance, comprising a user interface, said user interface comprising an assembly, said assembly comprising at least one fixed element, at least one rotary element, and a display, wherein at least one said rotary element is built as a user interface element, wherein said display is arranged inside and visible to an operator through said user interface element, wherein said at least one rotary element is axially constrained by the at least one fixed element, wherein the at least one rotary element comprises a rotary knob and a rotary encoder, wherein the rotary encoder comprises a step-like shape element which in a mounted position is at an outer circumference of the rotary knob, faces an electronic board and interacts with at least one optical transducer to recognize a direction of rotation of the rotary encoder.

2. The laundry treatment appliance according to claim 1, wherein said fixed element comprises a constraining portion shaped at least partially as a plane against which said rotary element at least partially axially abuts.

3. The laundry treatment appliance according to claim 1, wherein said assembly comprises an electronic board.

4. The laundry treatment appliance according to claim 1, wherein said fixed elements comprise a box and/or a display support and/or a display window.

5. The laundry treatment appliance according to claim 4, wherein said rotary encoder is axially constrained between said box and said display window in their respective mounted positions.

6. The laundry treatment appliance according to claim 4, wherein said display window is engaged with said box by at least one connection element.

7. The laundry treatment appliance according to claim 4, wherein said display support is engaged with said electronic board by at least one connection element.

8. The laundry treatment appliance according to claim 6, wherein said at least one connection element is a snap tooth.

9. The laundry treatment appliance according to claim 1, wherein said display is built as an LCD, LED, or TFT display.

10. The laundry treatment appliance according to claim 1, wherein at least one illuminating light element is arranged peripherally with respect to said user interface element.

11. The laundry treatment appliance according to claim 10, wherein at least one light guide is provided in front of at least one light element, whereby said light guide is constrained on a light guide seat provided on a box, wherein the box is the at least one fixed element.

12. The laundry treatment appliance according to claim 1, wherein said user interface element is configured as a stand-alone component.

13. The laundry treatment appliance according to claim 1, wherein said user interface element comprises at least one additional user element.

* * * * *